United States Patent
Myers et al.

(10) Patent No.: US 10,718,441 B2
(45) Date of Patent: Jul. 21, 2020

(54) VALVE SEAT WITH A HARDENED SLEEVE INTERIOR AND A METAL EXTERIOR

(71) Applicant: S.P.M. FLOW CONTROL, INC., Fort Worth, TX (US)

(72) Inventors: Jeff Myers, Fort Worth, TX (US); Joe Allen Sutton, Weatherford, TX (US)

(73) Assignee: S.P.M. Flow Control, Inc., Fort Worth, TX (US)

( * ) Notice: Subject to any disclaimer, the term of this patent is extended or adjusted under 35 U.S.C. 154(b) by 0 days.

(21) Appl. No.: 16/057,739

(22) Filed: Aug. 7, 2018

(65) Prior Publication Data

US 2019/0040966 A1 Feb. 7, 2019

Related U.S. Application Data

(60) Provisional application No. 62/542,240, filed on Aug. 7, 2017.

(51) Int. Cl.
| | |
|---|---|
| *F04B 53/00* | (2006.01) |
| *F16K 17/04* | (2006.01) |
| *F16K 15/02* | (2006.01) |
| *F16K 1/42* | (2006.01) |
| *F04B 39/10* | (2006.01) |
| *F16K 15/06* | (2006.01) |

(Continued)

(52) U.S. Cl.
CPC ........ *F16K 17/0466* (2013.01); *F04B 1/0461* (2013.01); *F04B 39/10* (2013.01); *F04B 53/1087* (2013.01); *F16K 1/42* (2013.01); *F16K 15/026* (2013.01); *F16K 15/063* (2013.01); *F16K 25/005* (2013.01); *F04B 1/053* (2013.01)

(58) Field of Classification Search
CPC ...... F16K 17/0466; F16K 1/42; F16K 15/026; F16K 15/063; F16K 25/005; F04B 1/0461; F04B 39/10; F04B 53/1087
USPC .................................................. 137/540, 902
See application file for complete search history.

(56) References Cited

U.S. PATENT DOCUMENTS

| | | |
|---|---|---|
| 4,951,920 A | 8/1990 | Tsuno |
| 7,070,166 B1 | 7/2006 | Blume |

(Continued)

FOREIGN PATENT DOCUMENTS

WO 2015077001 A1 5/2015

OTHER PUBLICATIONS

International Search Report and Written Opinion re PCT/US2018/45668 dated Oct. 19, 2018, 10 pages.

*Primary Examiner* — P. Macade Nichols
(74) *Attorney, Agent, or Firm* — Foley & Lardner LLP (57) ABSTRACT

A valve seat for use in a fluid end of a fracturing pump that includes a first body portion having an inner wall and an outer wall, wherein the inner wall forms a fluid bore and outer wall is configured to contact an inside surface of a fluid passageway of a fluid end of the fracturing pump for support therein. The seat further includes a second body portion extending from the first body portion, the second body having a frustro-conical portion forming a seating surface for receiving a valve. A portion of the first and second body portion includes a hardened material insert forming a portion of the seating surface and a portion of the inner wall of the first body, and further includes a metallic body portion affixed to the hardened material insert, the metallic body portion forming at least a portion of first body portion outer wall.

20 Claims, 8 Drawing Sheets (51) Int. Cl.
- F04B 1/0461 (2020.01)
- F16K 25/00 (2006.01)
- F04B 53/10 (2006.01)
- F04B 1/053 (2020.01)

(56) References Cited

U.S. PATENT DOCUMENTS

| | | |
|---|---|---|
| 7,726,026 B1 | 6/2010 | Blume |
| 9,631,739 B2 * | 4/2017 | Belshan ............... F16K 31/12 |
| 10,344,757 B1 * | 7/2019 | Stark .................... F16K 1/42 |
| 2015/0144826 A1 | 5/2015 | Bayyouk et al. |

* cited by examiner

VALVE SEAT WITH A HARDENED SLEEVE INTERIOR AND A METAL EXTERIOR

CROSS-REFERENCE TO RELATED APPLICATIONS

This application claims the benefit of U.S. Provisional Application 62/542,240 entitled "Valve Seat with a Hardened Sleeve Interior and a Metal Exterior," filed on Aug. 7, 2017, and is hereby incorporated by reference.

TECHNICAL FIELD

This disclosure generally relates to valve seats in oil and gas equipment, specifically, though not exclusively, for well completion by hydraulic fracturing equipment in the oil-and-gas space.

BACKGROUND OF THE DISCLOSURE

In oilfield operations, reciprocating pumps are used in fracturing subterranean formations in order to drill for oil or natural gas. A reciprocating pump typically includes a power end and a fluid end or cylindrical section. The fluid end is typically formed of a one piece construction or a series of blocks secured together by rods. The fluid end includes an opening for receiving a plunger or plunger throw, an inlet passage, an outlet passage, and an access port. A reciprocating pump, particularly in the oil-and-gas space, designed for fracturing operations is referred to as a "frac pump." Such frac pumps can be seen, for example, in U.S. Pat. No. 9,822,894 issued on Nov. 21, 2017 to the assignee of the present application, which is incorporated herein by reference in its entirety for all purposes.

During operation of a frac pump, a fluid is pumped into the fluid end through the inlet passage and out of the pump through the outlet passage. The inlet and outlet passages each include a valve assembly, which is a check type of valve that is opened by differential pressure of the fluid and that allows the fluid to flow in only one direction. This fluid often contains solid particulates or corrosive material that can cause corrosion, erosion and/or pitting on surfaces of the valve assembly.

One particular area of erosion and pitting generally occurs on interacting surfaces of the valve assembly, which consists of a valve seat fixed into the inlet or outlet passages within the fluid end and a valve body that moves cyclically relative to the valve seat. In operation, the valve is operable between an open position, in which the valve body is spaced apart from the valve seat to facilitate fluid flow through the valve, and a closed position, in which the valve body contacts and sealingly engages the valve seat.

Conventional valve seat designs use a steel or other metal as both the valve and the valve seat, causing considerable friction and wear where the two meet as the valve engages the valve seat. Over time, repetitive contact of the metallic valve seat with the metallic valve causes specific portions of the valve or valve seat to wear out faster than other parts, leading to costly repair work to bring the frac pump back online. Because the valve seat is securely fastened within the fluid end, it is more difficult and cumbersome to replace the valve seat than the valve body. For example, a valve seat is oftentimes fixed inside the fluid passageway by way of an interference fit. Removing the valve seat from the fluid passageway oftentimes increases the risk of damage to the pump fluid end.

SUMMARY

This summary is provided to introduce a selection of concepts in a simplified form that are further described below in the Detailed Description. This summary is not intended to identify key features or essential features of the claimed subject matter. Nor is it intended to be used as an aid in determining the scope of the claimed subject matter.

In a first general embodiment, a valve seat for use in a fluid end of a fracturing pump includes a first body portion having an inner wall and an outer wall. The inner wall forms a fluid bore. The outer wall is configured to contact an inside surface of a fluid passageway of a fluid end of the fracturing pump for support therein. The valve seat includes a second body portion extending from the first body portion. The second body portion has a frustro-conical portion forming a seating surface for receiving a reciprocatingly movable valve body. At least a portion of the first and second body portion includes a hardened material insert, which forms a portion of the seating surface and a portion of the inner wall of the first body. The hardened material insert further includes a metallic body portion affixed to the hardened material insert. The metallic body portion forms at least a portion of first body portion outer wall.

In one specific aspect, the metallic body portion forms a portion of the seating surface.

In another specific aspect, the insert forms the entirety of the seating surface.

In yet another specific aspect, the insert forms the entirety of the inner wall of the first body.

In yet another specific aspect, the insert forms the entirety of the second body.

In one specific aspect, the insert and the metallic body form at least a portion of the first body and at least a portion of the second body, the insert extending between and including a first end and a second end of the valve seat to forming the seating surface and the inner wall of the first body.

In another specific aspect, the insert is cylindrical forming at least a portion of the first body, the cylindrical member having an outer wall extending only in a direction parallel to a valve seat axis.

In yet another specific aspect, the metallic body includes an annular groove for supporting a seal therein.

In yet another specific aspect, the hardened material insert is made of at least one of tungsten carbide, zirconia, stabilized zirconia, tungsten carbide nickel, tungsten carbide cobalt, silicon nitride and sialon.

In one specific aspect, the second body extends radially beyond the outer wall of the first body to support the valve in the fluid passageway.

In another specific aspect, the valve seat further includes a first end and an opposed second end, the second end having an outer diameter different from an outer diameter of the first end to support the valve seat in the fluid passageway.

In a second general embodiment, a valve assembly for use in a fracturing pump includes a valve member reciprocatably movable into and out of engagement with a valve seat body to configure the valve assembly between open and closed positions. The valve member has a distal end for sealing against the valve seat and one or more legs for restraining lateral movement of the valve with respect to the valve seat. The valve seat body includes a first body configured to be inserted into a fluid passageway of the fracturing pump. The first body has an inner cylindrical surface and an outer cylindrical surface. The outer cylindrical surface has an outer diameter, D1. The valve seat body includes a second body extending radially from the first body having an inner seating surface facing the valve member and an opposed outer surface configured to contact the fluid passageway. The second body has an outer diameter, D2, greater than the outer diameter, D1. The difference between the diameters D2 and D1 allows the first body to be longitudinally supported by the fluid passageway. At least a portion of the first and second body portions includes a hardened material insert forming at least a portion of the seating surface and at least a portion of the inner wall of the first body. The portion of the first and second body portions further includes a metallic body portion affixed to the hardened material insert. The metallic body portion forms at least a portion of first body portion outer wall.

In a specific aspect, the insert forming a part of the inner cylindrical surface is positioned and sized to facilitate sliding engagement with the one or more legs of the valve member.

In another specific aspect, the metallic body portion forms a portion of the seating surface.

In yet another specific aspect, the hardened material insert forms the entirety of the seating surface.

In yet another specific aspect the hardened material insert forms the entirety of the inner cylindrical surface of the first body.

In one specific aspect, the hardened material insert forms the entirety of the second body.

In another specific aspect, the hardened material insert and the metallic body are fixed together by bonding, press-fit, shrink-fit, sintering, or combination thereof.

In a third general embodiment, a reciprocating pump assembly includes a power end coupled to a fluid end. The fluid end has a fluid inlet passage co-axially aligned with a fluid outlet passage. The reciprocating pump assembly further includes a valve assembly disposed within each of the fluid inlet passage and the fluid outlet passage. Each valve assembly includes a valve member reciprocatably movable into and out of engagement with a valve seat body to configure the valve assembly between open and closed positions. The valve seat body includes a first body configured to be inserted into the fluid inlet passage. The first body has an inner cylindrical surface and an outer cylindrical surface. The outer cylindrical surface has an outer diameter, D1. The valve seat body includes a second body extending from the first body having an inner seating surface facing the valve member and an opposed outer surface configured to contact the fluid passageway. The second body has an outer diameter, D2, greater than the outer diameter, D1, such that the difference between the diameters D2 and D1 allows the valve assembly to be longitudinally supported by the fluid passageway. At least a portion of the first and second body portions includes a hardened material insert forming at least a portion of the seating surface and at least a portion of the inner wall of the first body. The portion of the first and second body portions further includes a metallic body portion affixed to the hardened material insert. The metallic body portion forms at least a portion of first body portion outer wall.

In one specific aspect, the insert forms the entirety of the second body.

The aforesaid embodiments are described in more detail below, as are additional or alternative embodiments.

DESCRIPTION OF THE FIGURES

The accompanying drawings facilitate an understanding of the various embodiments.

DETAILED DESCRIPTION

Examples disclosed herein generally refer to a valve seat that includes a hardened material insert manufactured out a high-strength hardened material and a steel body portion. In various examples, the hardened material insert is attached to a steel body, creating a valve seat that is part hardened material (e.g., tungsten carbide) and part steel. The hardened material is placed in the valve seat in places that are conventionally prone to erosion, corrosion, pitting, and other wear-and-tear caused through contact with a valve. The hardened material of the valve seat is more resilient to repetitive contact with a valve head than the steel or metal body of the valve seat. Placement of the hardened material insert at key wear points extends the life of the valve seat considerably, allowing it to sustainably function through longer periods of operation.

The disclosed examples often refer to portions of the valve seat including inserts or otherwise being manufactured out of a "high-strength hardened material" (or simply a "hardened material"). Examples of high-strength hardened materials include, without limitation, zirconia, partially stabilized zirconia, tungsten carbide, tungsten carbide nickel, tungsten carbide cobalt, titanium carbide, silicon nitride, sialon, silicon, silicon nitride, ceramic, or other hardened material. Making portions of the seat valve out of such materials enables the various disclosed examples to protect against conventional corrosion, pitting, and other wear-and-tear caused by valve heads or body repetitively impacting the valve seats. Put another way, some of the examples place hardened material portions where constant valve friction occurs to extend the life of the valve seat itself, and by extension the life of a frac pump. In particular, the hardness of the tungsten carbide may range from about 620-1076 HV with reference to the Vickers hardness number.

To aid the reader, various examples are described as having a tungsten carbide hardened material insert, which is one example material that may be used. Any of the other hardened materials mentioned herein may be used.

Figure 1:
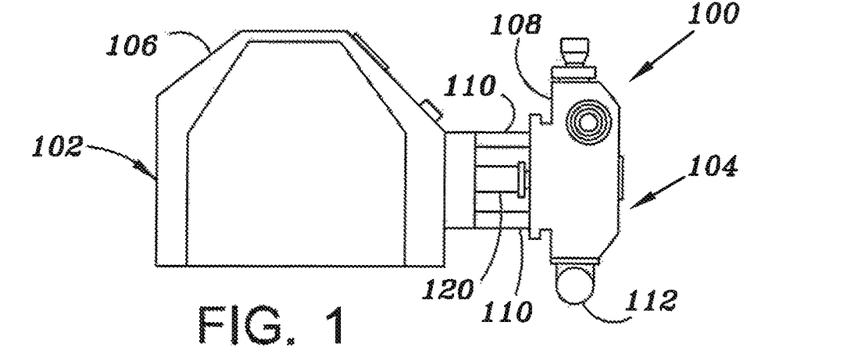
FIG. 1 is an elevational view of a reciprocating pump assembly, according to one example.
Figure 2:
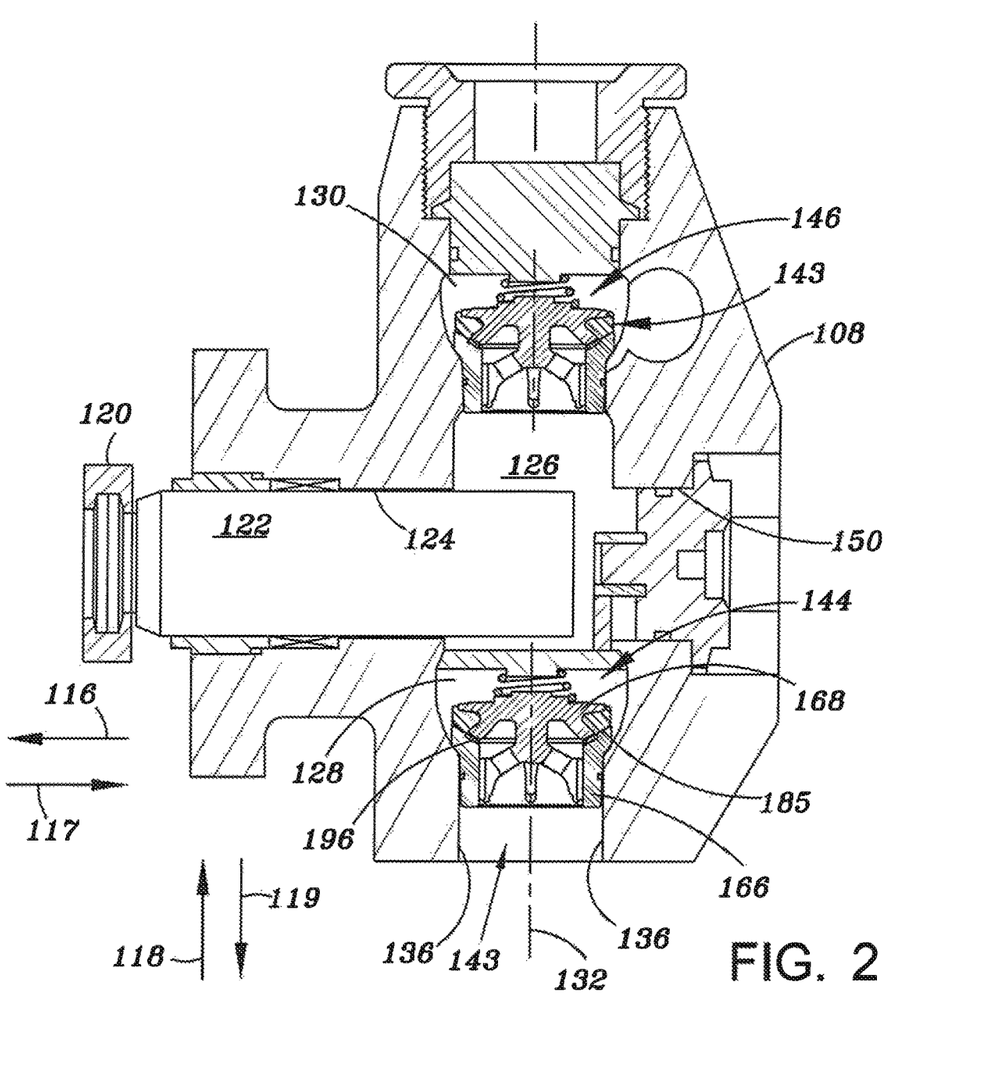
FIG. 2 is a cross-sectional view of the fluid cylinder assembly of FIG. 1, according to one example.
Figure 3:
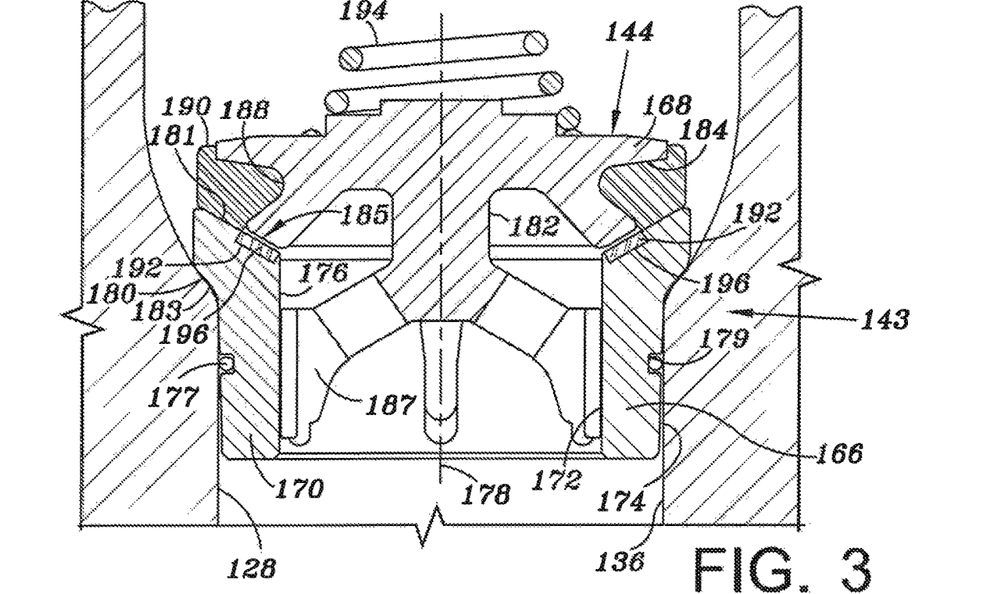
FIG. 3 is an enlarged view of the inlet valve assembly illustrated in FIG. 2, according to one example.

Referring to FIGS. 1-3, an illustrative example of a reciprocating pump assembly 100 is presented in which an insert 196 (shown in various geometries in FIGS. 3-12) is used to reduce damage to the pump assembly 100. In the examples disclosed herein, the insert 196 is formed of a high-strength hardened material (e.g., zirconia, partially stabilized zirconia, tungsten carbide, tungsten carbide nickel, tungsten carbide cobalt, titanium carbide, silicon nitride, sialon, silicon, silicon nitride, ceramic, or the like). It should be understood that insert 196 may be formed in a number of geometries, as shown in FIGS. 2-12, for example.

FIG. 1 is an elevational view of a reciprocating pump assembly 100, according to one example. The reciprocating pump assembly 100 includes a power end portion 102 and a fluid end portion 104 operably coupled thereto. The reciprocating pump assembly 100 may be used in various industrial applications, such as, for example, as a hydraulic fracturing (frac) pump in the oil-and-gas industry. Other applications are also contemplated. Looking closer at the assembly, the power end portion 102 includes a housing 106 in which a crankshaft (not shown) is disposed. The crankshaft may be driven by an engine or motor (not shown). The fluid end portion 104 may include a fluid end block or fluid cylinder 108, which is connected to a housing 106 via a plurality of stay rods 110. In operation and as discussed in further detail below, the crankshaft reciprocates a plunger rod assembly 120 between the power end portion 102 and the fluid end portion 104. According to some examples, the reciprocating pump assembly 100 is freestanding on the ground, is mounted to a trailer for towing between operational sites, or is mounted to a movable skid.

FIG. 2 is a cross-sectional view of the fluid cylinder 108 of FIG. 1. Specifically, the plunger rod assembly 120 includes a plunger 122 extending through a bore 124 and into a pressure chamber 126 formed in the fluid cylinder 108. At least the bore 124, the pressure chamber 126, and the plunger 122 together may be characterized as a plunger throw. According to some examples, the reciprocating pump assembly 100 includes three plunger throws (i.e., a triplex pump assembly); however, in other examples, the reciprocating pump assembly includes a greater or fewer number of plunger throws.

In the example illustrated in FIG. 2, the fluid cylinder 108 includes fluid inlet and outlet passages 128 and 130, respectively, formed therein, which are generally coaxially disposed along a fluid passage axis 132. As described in greater detail below, fluid is adapted to flow through the fluid inlet and outlet passages 128 and 130 and along the fluid passage axis 132. In the illustrated example, an inlet valve assembly 144 is disposed in the fluid inlet passage 128 and an outlet valve assembly 146 is disposed in the fluid outlet passage 130. In FIG. 2, the valve assemblies 144 and 146 are spring-loaded, which, as described in greater detail below, are actuated by at least a predetermined differential pressure across each of the valve assemblies 144 and 146. Other actuation techniques may be used, such as using hydraulics, solenoids, pressurized disks, or other mechanical or electromechanical components.

FIG. 3 is an enlarged view of the inlet valve assembly 144, according to one example. The inlet valve assembly 144 includes a valve seat 166 and a valve body 168 engaged therewith. In some examples, the valve seat 166 includes a first or cylindrical body 170 having an inner surface 172 and an opposing outer surface 174. The inner surface 172 forms a bore 176 along a valve seat axis 178 of the valve seat 166, which is coaxial with the fluid passage axis 132 when the inlet valve assembly 144 is disposed in the fluid inlet passage 128. In the embodiment illustrated in FIG. 3, the outer surface 174 of the cylindrical body 170 contacts and is otherwise supported on an inside surface 136 of the fluid cylinder 108. In some embodiments, a sealing element such as an O-ring (not illustrated), is disposed in an annular groove 179 formed in the outer surface 174 of the cylindrical body 170 to sealingly engage the inside surface 136 of the fluid inlet passage 128. According to some embodiments, the cylindrical body 170 forms an interference fit or is press fit against the inside surface 136 so that the valve seat 166 is securely fastened within the fluid inlet passage 128.

According to certain embodiments, at least a portion of the valve seat 166 or valve body 168 is formed from steel, while other portions are formed from hardened material. The steel used disclosed herein may include, for example, stainless steel, low-carbon steel (e.g., with less than 0.3% carbon); medium-carbon steel (e.g., 0.3-0.6% carbon); high-carbon steel (e.g., more than 0.6% carbon); alloy steels, (e.g., manganese, silicon, nickel, titanium, copper, chromium, aluminum, and the like) or any other type of steel and/or metal.

Figure 4:
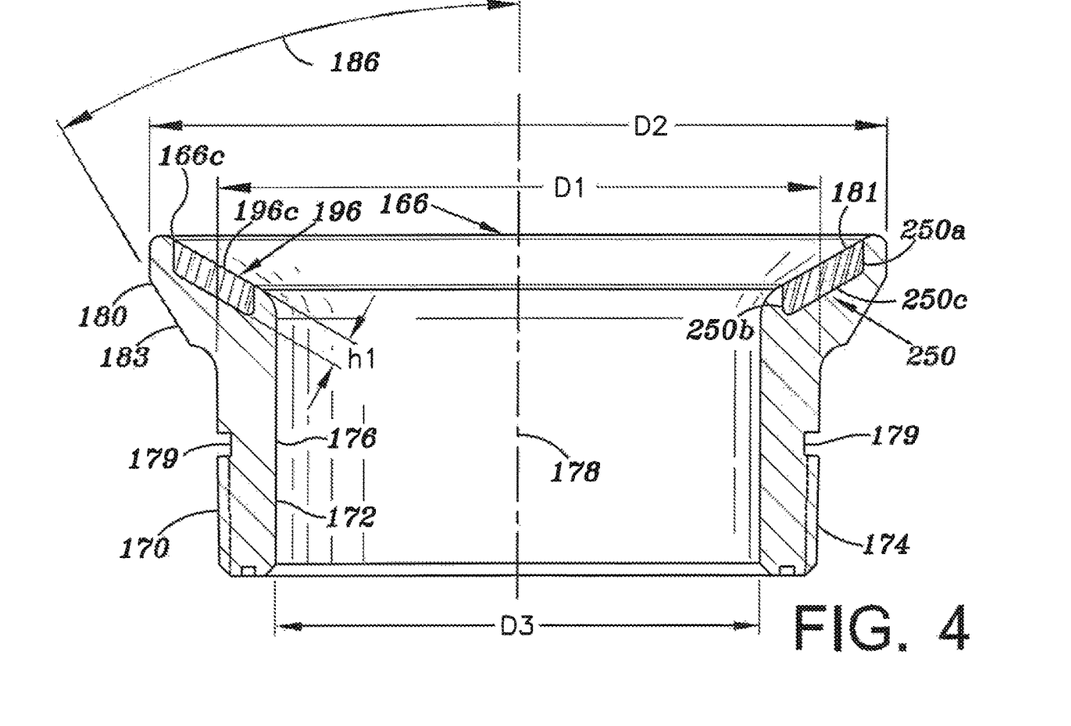
FIG. 4 is a cross-sectional view of a valve seat, according to one example.

Referring to FIGS. 3 and 4, the valve seat 166 further includes a first or lower body portion 170, and a second or upper body portion 180, the second body 180 having a seating surface 181 extending radially outward, and an opposing, outer surface 183. According to some embodiments, the outer surface 183 contacts and otherwise abuts against the inside surface 136 of the fluid inlet passage 128 (FIG. 3). In some examples, the inner seating surface 181 extends at an angle 186 from the valve seat axis 178. Examples of angle 186 include, without limitation, 5°-175°, e.g., at or about 5°, 10°, 15°, 20°, 25°, 30°, 35°, 40°, 45°, 50°, 55°, 60°, 65°, 70°, 75°, 80°, 85°, 90°, 95°, 100°, 105°, 110°, 115°, 120°, 125°, 130°, 135°, 140°, 145°, 150°, 155°, 160°, 170°, 175°, or any measurement in between. The second body 180 has an outer diameter, D2, greater than the outer diameter, D1, of the first body 170, to as discussed in greater detail below, allow the valve seat to be longitudinally supported by the fluid passage 128.

According to some examples, the insert 196 is formed from a hardened material. In an exemplary, non-limiting embodiment, the hardened material may be zirconia, partially stabilized zirconia, tungsten carbide, tungsten carbide nickel, tungsten carbide cobalt, titanium carbide, silicon nitride, sialon, silicon, silicon nitride, ceramic, or the like.

Alternatively and as explained in greater detail below, some examples include the insert 196 of tungsten carbide disposed along a portion of and forming the inner surface 172 of the first body 170 and/or along all or a portion of the inner seating surface 181. As illustrated, for example, in FIGS. 8-12, these alternative examples fashion an outer portion of the cylindrical body 170 and an outer portion of the second body 180 (i.e., the portions along part or all of the outer surfaces 174 and 183 of the cylindrical body 170 and the second body 180, respectively) out of steels or other types of metals.

According to some embodiments, the insert 196 may be attached to steel or metal portions of the valve 166 seat in a number of ways. For example, the insert 196 may be pressed, cast in place, shrunk via cold temperatures and put in place, friction welded, applied with a brazing solution, glued or bonded via some adhesive, chemically bonded, press fit, shrink fit, sintered, welded, or a combination thereof. In other examples, the insert is a coating applied by dipping or spraying. In operation, the insert 196 is used to extend the life span of the valve assembly 143, which is subject to corrosion, erosion, or pitting during operation caused by the valve body 168 repetitively hitting the valve seat 166.

Referring to FIGS. 1-3, the valve body 168 includes a tail portion 182, from which a head portion 184 extends radially outward. An annular cavity 188 is formed in the head portion 184 to receive a seal 190 to sealingly engage at least a portion of the inner surface 181 of the valve seat 166. In the example illustrated in FIG. 3, for example, the head portion 184 further includes a distal end 185 configured to sealingly engage at least a portion of the inner surface 181. According to some examples, the distal end 185 has a material hardness less than the material hardness of the inner surface 181. In an alternative example, the distal end 185 has a material hardness substantially equal to the inner surface 181. In this configuration, the valve body 168 typically wears faster, and thus, needs to be replaced before the valve seat 166. As one skilled in the art will appreciate, the valve body 168 is generally easier, and thus cheaper, to replace than the valve seat 166.

With continued referenced to FIG. 3, the tail portion 182 includes a plurality of circumferentially-spaced legs 187 angularly extending from the head portion 184 to slidably engage the inside surface 172 of the cylindrical body 170. In FIG. 3, the head portion 184 is engaged and otherwise biased by a spring 194, which, as discussed in greater detail below, biases the valve body 170 to a closed position, to prevent fluid flow. Other examples do not include springs.

In the example illustrated in FIG. 3, for example, the seal 190 is molded in place in the head portion 184. In other embodiments, the seal 190 is preformed and then attached to the head portion 184. According to some examples, the seal 190 is composed of one or more materials such as, for example, a deformable thermoplastic material, a urethane material, a fiber-reinforced material, carbon, glass, cotton, wire fibers, cloth, and/or any combination thereof. In other embodiments, the seal 190 is composed of a cloth, which is disposed in a thermoplastic material. According to some embodiments, the cloth includes carbon, glass, wire, cotton fibers, and/or any combination thereof. In yet other embodiments, the seal 190 is composed of at least a fiber-reinforced material, which can prevent or at least reduce delamination. According to embodiments disclosed herein, the seal 190 has a hardness of 95 A durometer or greater, or a hardness of 69 D durometer or greater based on the Rockwall Hardness scale. In several exemplary embodiments, the head portion 184 is harder and more rigid than the seal 190.

In the embodiment illustrated in FIG. 2, the outlet valve assembly 146 is identical to the inlet valve assembly 144 and therefore will not be described in further detail.

In operation, the plunger 122 reciprocates within the bore 124 for movement in and out of the pressure chamber 126. That is, the plunger 122 moves back and forth horizontally, as viewed in FIG. 2, away from and towards the fluid passage axis 132 in response to rotation of the crankshaft (not shown) that is enclosed within the housing 106. As the plunger 122 moves in the direction of arrow 116 out of the pressure chamber 126, the inlet valve 144 is opened. More particularly, as the plunger 122 moves away from the fluid passage axis 132 in the direction of arrow 116, the pressure inside the pressure chamber 126 decreases, creating a differential pressure across the inlet valve 144 and causing the valve body 168 to move upward in the direction of arrow 118, as viewed in FIGS. 2 and 3, relative to the valve seat 166. As a result of the upward movement of the valve member 168, the spring 194 is compressed and contact surface 185 separates from the inner surface 181, which contains in this illustrated example hardened material insert 196, to create the open position.

Fluid entering through the fluid inlet passage 112 (FIG. 1) flows along the axis 132 and through the inlet valve 144, being drawn into the pressure chamber 126. To flow through the inlet valve 144, the fluid containing particulates flows through the bore 176 of the valve seat 166 and along the valve seat axis 178. During the fluid flow through the inlet valve 144 and into the pressure chamber 126, the outlet valve 146 is in its closed position, with the seal 190 of the valve body 168 of the outlet valve 146 engaging the inner surface 181 of the tapered shoulder 180. Fluid continues to be drawn into the pressure chamber 126 until the plunger 122 is at the end of its stroke farthest away from the fluid passage axis 132. At this point, the differential pressure across the inlet valve 144 is such that the spring 194 of the inlet valve 144 begins to decompress and extend, forcing the valve member 168 of the inlet valve 144 to move downward in the direction of arrow 119. As a result, the inlet valve 144 moves to and is otherwise placed in the closed position, with the seal 190 and the distal end 185 sealingly engaging the inner surface 181 and/or insert 196, respectively.

As the plunger 122 moves in the direction of arrow 117 into the pressure chamber 126, the pressure within the pressure chamber 126 increases. The pressure increases until the differential pressure across the outlet valve 146 exceeds a predetermined set point, at which point the outlet valve 146 opens and permits fluid to flow out of the pressure chamber 126, along the fluid passage axis 132 through the outlet valve. As the plunger 122 reaches the end of its stroke towards the fluid passage axis 132 (i.e., its discharge stroke), the inlet valve 144 is positioned in the closed position, with the seal 190 and the distal end 185 sealingly engaging the inner surface 181/196, respectively. Because particulates from the fluid oftentimes become trapped between the contacting surfaces of the valve body 168 and/or the valve seat 170, the hardened material (e.g., tungsten carbide) insert 196 reduces and/or otherwise prevents the wear of the valve body 168 and/or the valve seat 166. For illustrative purposes, the insert 196 is only shown as being positioned in the valve seat 166; however, it should be appreciated that the insert 196 may be positioned in both the valve body 168 and the valve seat 166 to prevent wear.

Additionally or alternatively, the insert 196 may be disposed in various places in the valve seat 166. FIGS. 3-6 illustrate examples in which the insert 196 is positioned only along all or a portion of the inner seating surface 181 of the second body 180 of the valve seat 166, leaving the rest of the valve seat 166 to be made of steel or other metal. Other examples, such as that illustrated in FIG. 8, have hardened material (e.g., tungsten carbide) inserts 196 spanning along and forming a portion or all of the inner surface 172 of the cylindrical body 170 of the valve seat 166. The remaining portions of the valve seat 166 in such examples may be fashioned out of steel or other metal. Still other examples include a combination whereby the insert 196 spans a portion or all of the inner side of the inner seating surface 181 of the tapered shoulder 180 and also along a portion or all of the inner surface 172 of the first/cylindrical body 170 of the valve seat 166. Placing the insert along both the inner surface 181 of the tapered shoulder 180 and the inner surface 172 of the cylindrical body 170 provides additional protection against wear of the valve seat 166.

Referring now to FIGS. 3-6 and 7-14, multiple examples of profiles and geometries of the hardened material insert 196 are illustrated. For the sake of clarity, these examples are described as including inserts 196 that are made of tungsten carbide. Alternative embodiments use various other disclosed hardened materials as the inserts, and do so in the various geometries shown in FIGS. 3-6 and 7-14.

According to some examples, the hardness of the insert 196 may be harder than surrounding areas. For example, the valve seat 166 includes the insert 196 having first hardness, H1, that is greater than second hardness, H2, of the adjacent valve seat 166 material or of the contact surface of the valve body 168, which may include the seal 190 and the end portion 185. In some examples, the valve seat 166 and the valve body 168 are formed from stainless steel with the insert 196 formed from a tungsten carbide.

According to examples disclosed herein, the tungsten carbide insert 196 is secured by bonding, press-fitting, heating, cooling, shrinking, gluing, shrink-fitting, sintering, welding, or combinations thereof. As shown in FIGS. 4-6 and 8, the tungsten carbide insert 196 has a height, h1. In some embodiments, the height, h1, is between about 1/32 inches to about 1/2 inches. In other examples, the insert 196 is a coating that is applied by dipping or spraying having a thickness between about 1/32 inches and 1/2 inches; however, such thickness may vary.

The insert 196 is formed of different shapes and sizes, and additionally and/or alternatively, may be positioned as shown in any of the geometries of FIGS. 3-6 and 8-12. The size, shape, and placement of the insert 196 depends on the operational environment. The insert 196 may be sized, shaped, or placed based on areas of the valve assembly 144 that are subject to the most erosion or pitting. Likewise, variances in operational, ambient, or environmental temperatures, along with the operational forces applied to and/or otherwise acting on the insert 196 (e.g., the tensile and compressive forces) may affect the size, shape or placement of the insert 196.

According to some examples, the insert 196 spans to form the entire seating surface 181 of the second body 180 and/or along with forming at least a portion of, and in some embodiments, the entirety of the inner surface 172 of the first body 170. Alternatively, the insert 196 may span to form only a portion of the inner seating surface 181. In still other examples, the insert 196 spans to form only portions or all of the inner seating surface 181. In yet other examples, the insert 196 spans to form only portions or all of the inner surface 172 of the first body 170. The remaining portions of the inner surfaces 181 and 172 not otherwise formed of the insert 196 may be fashioned out of steel or another metal. Several of these examples with varying geometries of the insert 196 being placed along with portions of steel or metal are depicted in FIGS. 3-12.

FIG. 4 illustrates the insert 196 positioned in the valve seat 166. In the embodiment illustrated in FIG. 4, the insert 196 is disposed within a cavity 250 formed in the valve seat 166 by sidewalls 250a, 250b and 250c. In one embodiment, the contact surface 196c of the insert 196 is flush with the surrounding contact 166c of the valve seat 166. In one example (not shown), the contact surface 196c of the insert 196 is raised relative to the contact surface 166c of the valve seat 166. According to some embodiments, the insert 196 may be bonded in place, although other means of installation may be utilized.

Figure 5:
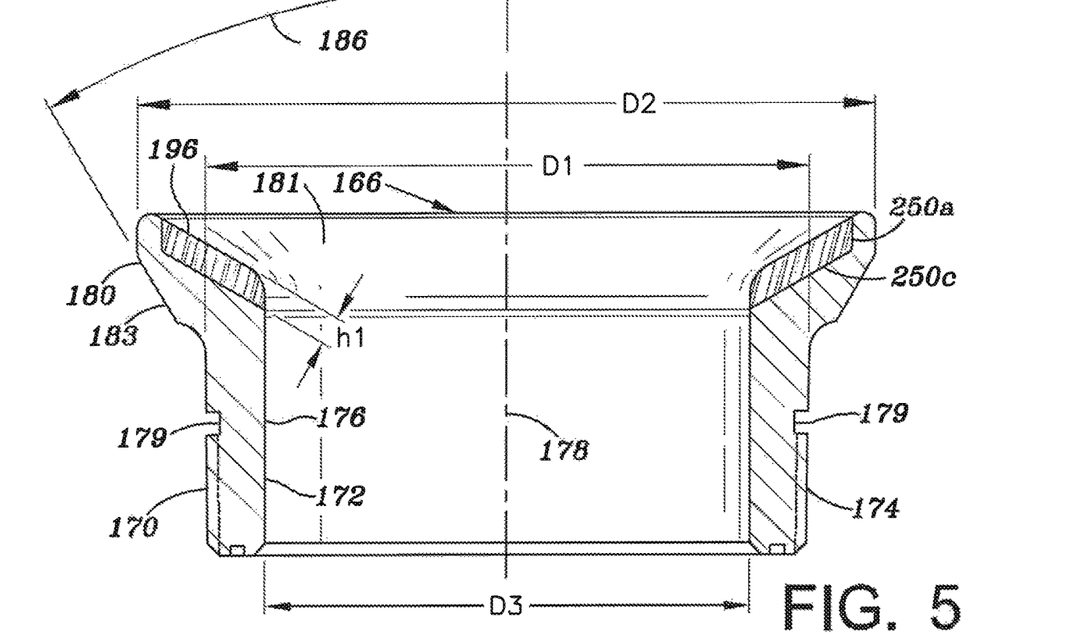
FIG. 5 is a cross-sectional view of a valve seat, according to one example.
Figure 6:
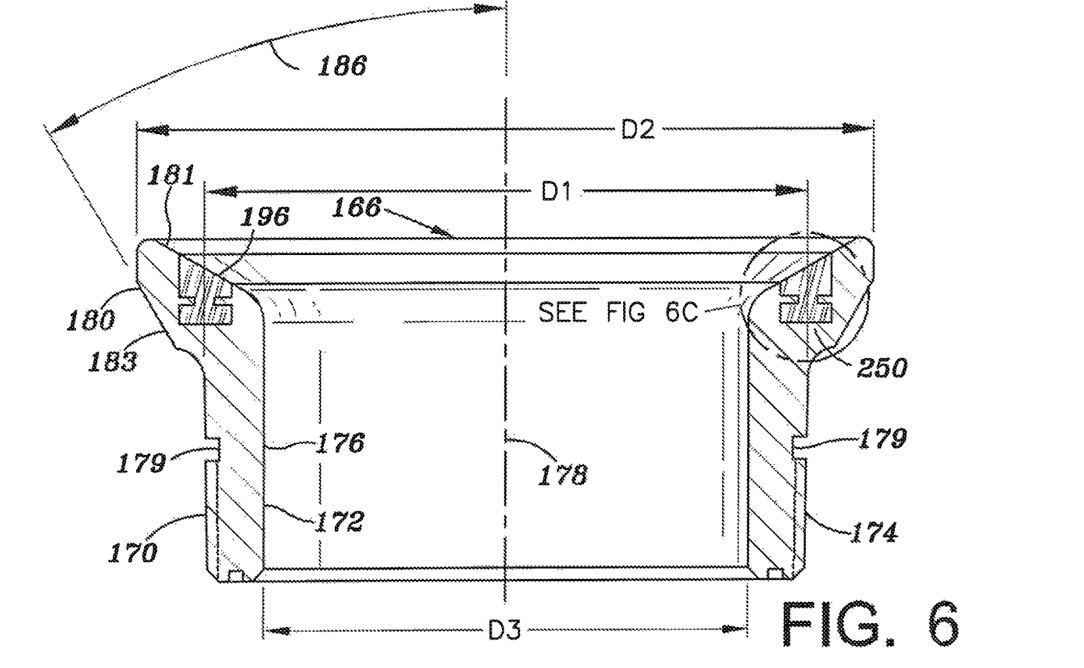
FIG. 6 is a cross-sectional view of a valve seat, according to one example.

FIGS. 5 and 6 show alternative geometries for the insert 196 being placed in the valve seat 166. In the embodiment illustrated in FIG. 5, the insert 196 is positioned in the valve seat 166 and surrounded by two sidewalls 250a and 250c of the valve seat 166. In the example of FIG. 5, the insert 196 spans more than half of the inner surface 181, ranging from the intersection of the tapered shoulder 180 with the cylindrical body 170 toward the upper portion of the tapered shoulder 180 that faces away from the cylindrical body 170. In other examples, the insert 196 spans the lower 10%, 15%, 20%, 25%, 30%, 33%, 35%, 40%, or 45% of the tapered shoulder 180 from the cylindrical body 170 toward the upper portion. In other examples, the insert 196 spans more than 50%, e.g., 60%, 65%, 67%, 70%, 75%, 80%, 85%, 90%, or 95% of the tapered shoulder 180 from the cylindrical body 170 toward the upper portion.

In other embodiments, such as that illustrated in FIG. 6, the insert 196 is shaped as an I-beam, with a lower anchoring base that fits in the steel of the valve seat 166 and an upper elongated portion (compared to the anchoring base) with an angled face aligning with the slope of the tapered shoulder 180 along the inner surface 181 of the valve seat 166. As shown, this insert 196 in FIG. 6 may be positioned in or about the middle of the inner surface 181 of the tapered shoulder 180, providing a seal with the valve seat 166. It should be understood that the insert 196 may be otherwise positioned so as to form any other portion of the inner surface 181 and may vary in size (e.g., taller, shorter, wider, narrower or combinations thereof).

Figure 7:
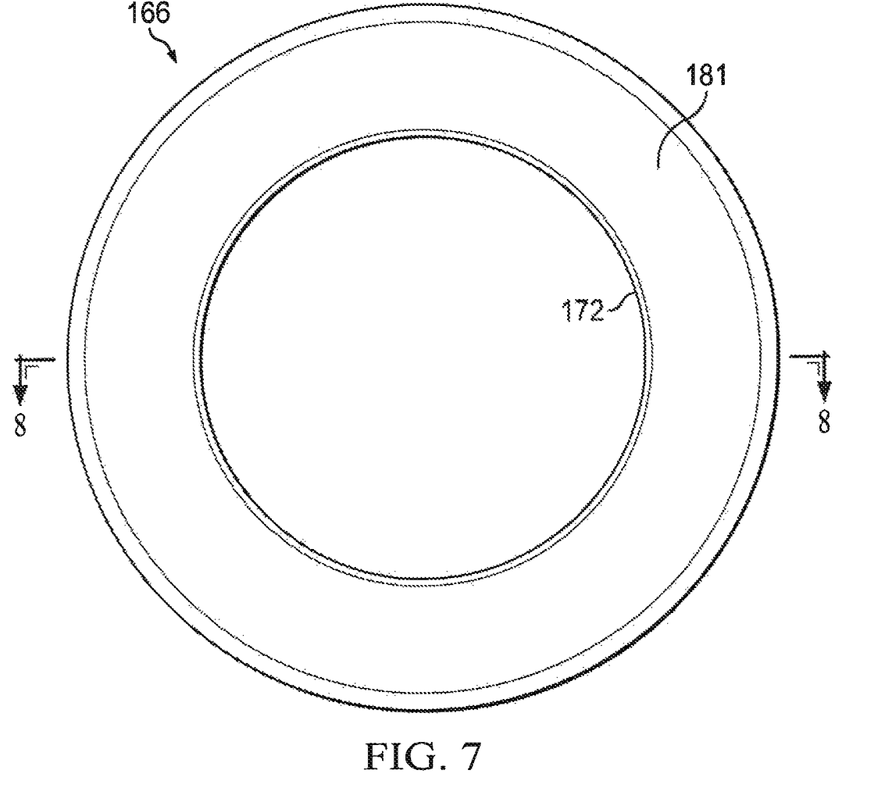
FIG. 7 is a top view a valve seat, according to one example.

FIG. 7 illustrates a top view of the valve seat 166. The central axis in FIG. 7 shows the section line 8-8 from which the views in FIGS. 3-6 and 8-12 are shown. As shown in FIG. 7, the valve seat 166 is a circular in shape. The seating surface 181 is formed of a frustro-conical shape and the inner surface 172 is cylindrically shaped. Alternative embodiments may include different shapes of valve seat 166, including the inner surface 172, e.g., rectangular, square, triangular, hexagonal, and the like.

FIGS. 8-12 illustrate multiple examples of the valve seat 166 formed of the insert 196 and a metallic body portion 350. In FIGS. 8-12, all or portions of the first body 170 and all or portions of the second body 180 comprise or are otherwise lined with the insert 196. For example, referring specifically to FIG. 8, the insert 196 forms the entirety of the second body 180 and extends to form the entirety of the inner surface 172 of the first body 170. In particular, the insert 196 is sized and shaped to form the inner surface 172, the seating surface 181, an outer surface comprising walls 300, 302 and 304. In the embodiment illustrated in FIG. 8, the walls 302 and 304 form a recess 308 to receive and otherwise engage with a metallic body 350. For the sake of clarity, the metallic body is described herein steel; however, other types of metals and non-metals may be utilized.

Figure 8:
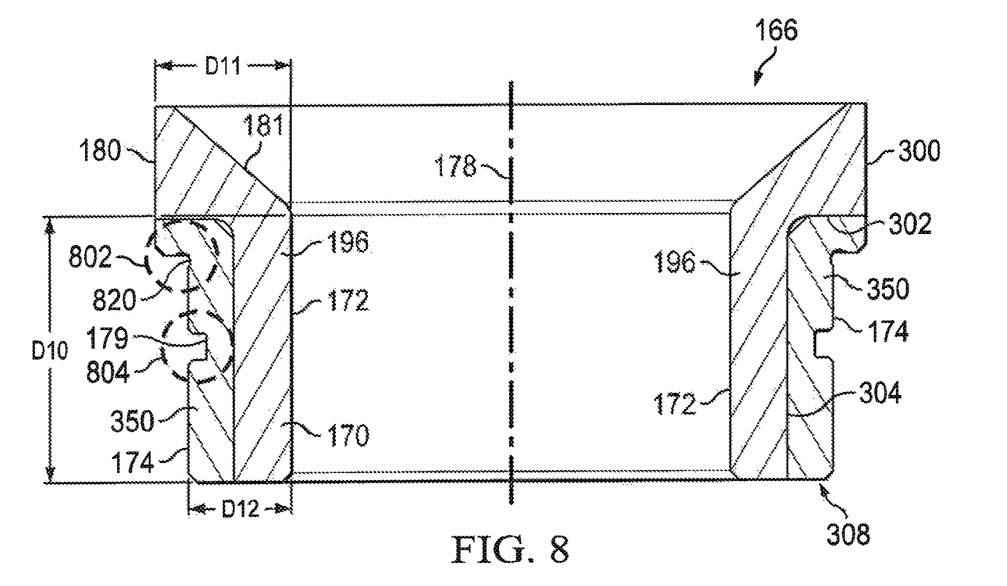
FIG. 8 is a cross-sectional view of a valve seat, according to one example.

It should be understood that FIG. 8 illustrates one example of a valve seat 166 having insert 196 and the metallic body 350. In this example, the entirety of the second body 180 is formed of the insert 196. Put another way, in some examples, the entire second body/tapered shoulder 180, including all of the seating surface 181, is formed of a material such as, for example, tungsten carbide. In the embodiment illustrated in FIG. 8, This can be seen from the horizontal distance D11 of the tapered shoulder 180 being fully made of the insert 196 hardened material.

In the embodiment illustrated in FIG. 8, the insert 196 forms the entirety of the inner surface 172. Furthermore, in one example, the insert 196 extends up to or near half of the thickness/horizontal distance D12 of the cylindrical body 170, extending from the inner surface 172 toward the outer surface 174. Other examples may cover less or more than 50% of the thickness/horizontal distance D12, such as, for example but without limitation 1%, 2%, 3%, 4%, 5%, or any other thickness/horizontal distance between 0-50%. Other examples may cover more than 50% of the thickness/horizontal distance D12, such as, for example and without limitation, 51%, 52%, 53%, 54%, 55%, or any other horizontal distance between 0-99%.

According to some embodiments, the metallic body 350 vertically covers (i.e., along axis 178) the first body 170 along an entire vertical distance D10 and only a portion (e.g., 33%) of the horizontal distance D12. Alternatively, in some embodiments, the metallic body 350 covers only a portion of the vertical distance D10 (e.g., the upper portion toward the second body 180), including for example, only 1-50% of the first body 170 such that a portion of the wall 304 is exposed and otherwise not in contact with the metallic body 350.

Figure 13:
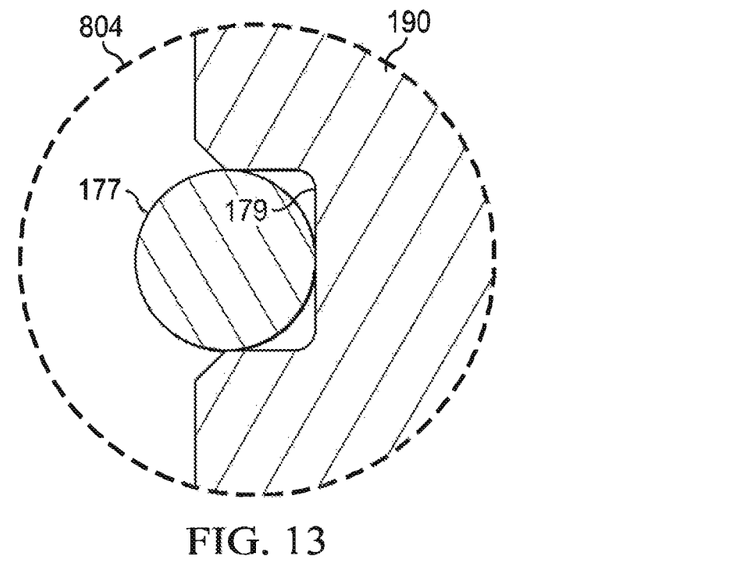
FIG. 13 is an expanded view of a portion of a valve seat, according to one example.

According to some embodiments, the metallic body 350 includes the annular groove 179, which, as mentioned above, may receive a sealing element 177 (e.g., an O-ring) to sealingly engage the inside surface 136 of the fluid inlet passage 128, as best illustrated in FIG. 13.

Figure 14:
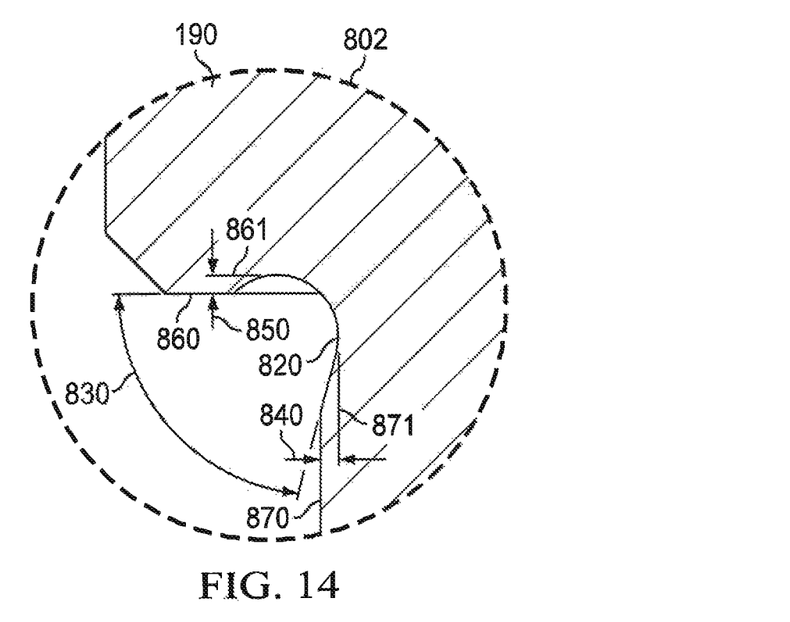
FIG. 14 is an expanded view of a portion of a valve seat, according to one example.

Additionally or alternatively, the metallic body 350 includes a notched recess 820, as illustrated specifically in FIG. 14. In the embodiment illustrated in FIG. 14, an expanded view 802 of the recess 820 is shown. According to the illustrated embodiment, the recess 820 has an angular curvature 830 of less than 90° between edges 860 and 870. For example, the recess 820 may curve at a curvature 830 of 30°, 45°, 60°, or any other angular curvature between 0-90°. Alternative embodiments may include recesses positioned where recess 820 is located having angular curvatures 830 greater than 90°, e.g., between 90°-175°.

As illustrated in FIG. 14, the distances 850 and 840 represent the distances between edges 860 and 861 and 870 and 871, respectively, at the ends of edges 860 and 870. This distance is caused by the fact that edges 861 and 871 slope away from the recess 820 while edges 861 and 871 are perpendicular to each other, meeting at a right angle at the curvature middle of the recess 820. In some specific examples, the distance 850 between edges 860 and 861 measures at or near 0.015 inches, and the gap 840 created between edges 870 and 871 measures at or near 0.022 inches. These, of course, are examples of the illustrates gaps 850 and 840, as other examples will create different gaps based on the curvatures of the recess 820.

Figure 9:
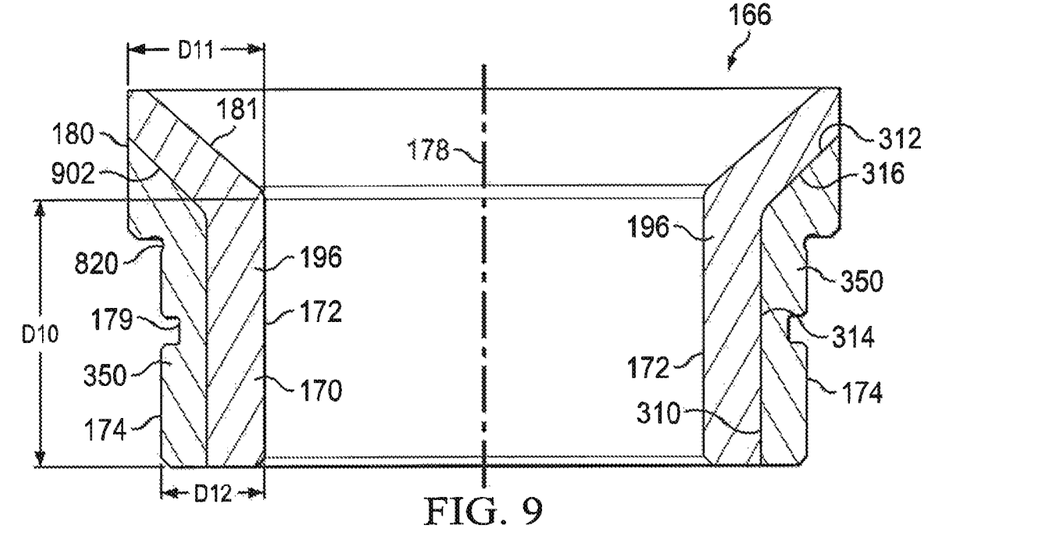
FIG. 9 is a cross-sectional view of a valve seat, according to one example.

Referring now to FIG. 9, an additional example of a seat valve 166 formed having an insert 196 and a metallic body 350 is illustrated. In the embodiment illustrated in FIG. 9, the metallic body 350 extends partially into the second body 180 to form a portion thereof. A tapered or otherwise angled surface 312 is formed on the steel body 350 so as to support the insert 196 thereon. In FIG. 9, the metallic body 350 includes an inner vertical surface 310 and the inner angled surface 312 angularly extending from the inner vertical surface 310. The insert 196 includes a corresponding vertical outer surface 314 and an angular outer surface 316 angularly extending from the vertical outer surface 314 to align with and otherwise engage surfaces 310 and 312 of the metallic body 350. It should be understood that the valve seat 166 illustrated in FIG. 9 may be otherwise configured. For example, the insert 196 may only extend along the vertical portion D10 of the first body 170 and thus, forms no portion of the second body 180. Alternatively, the insert 196 may only extend and be disposed within the second body 180 so that the metallic body 350 forms the entirety of the first body 170.

Figure 10:
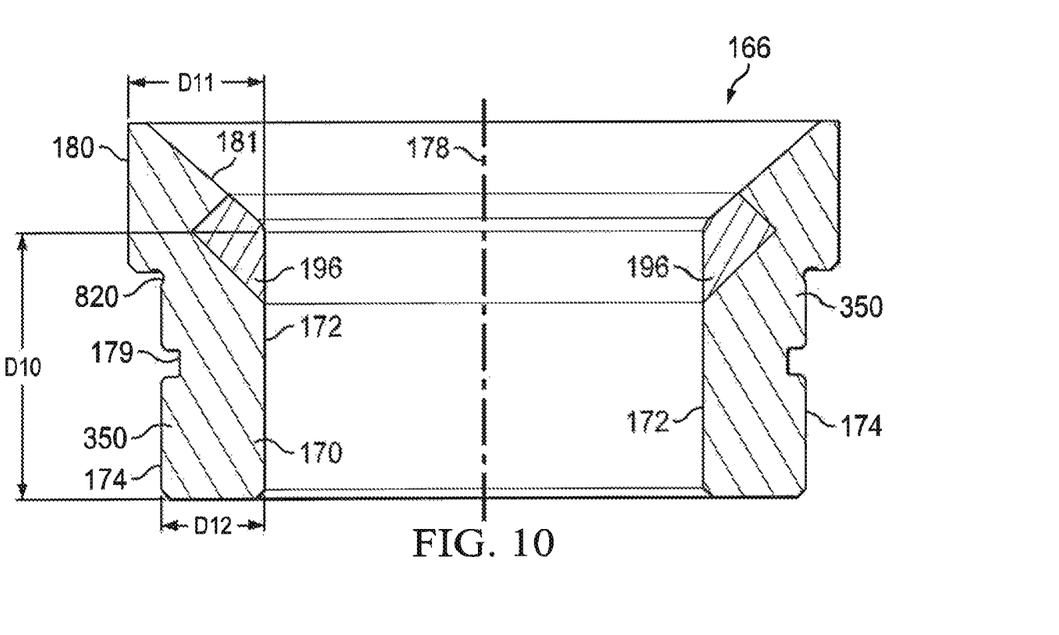
FIG. 10 is a cross-sectional view of a valve seat, according to one example.

FIG. 10 illustrates another example of a valve seat 166 with an insert 196 and a metallic body 350. In this example, the insert 196 covers intersection of the first and second bodies 170 and 180. In particular, the lower bend of the first body 180, e.g., where the second body 180 meets the first body 170. In this example, the seating surface 181 is partially formed of steel and partially formed of hardened material, such as tungsten carbide (or any other hardened material).

Figure 11:
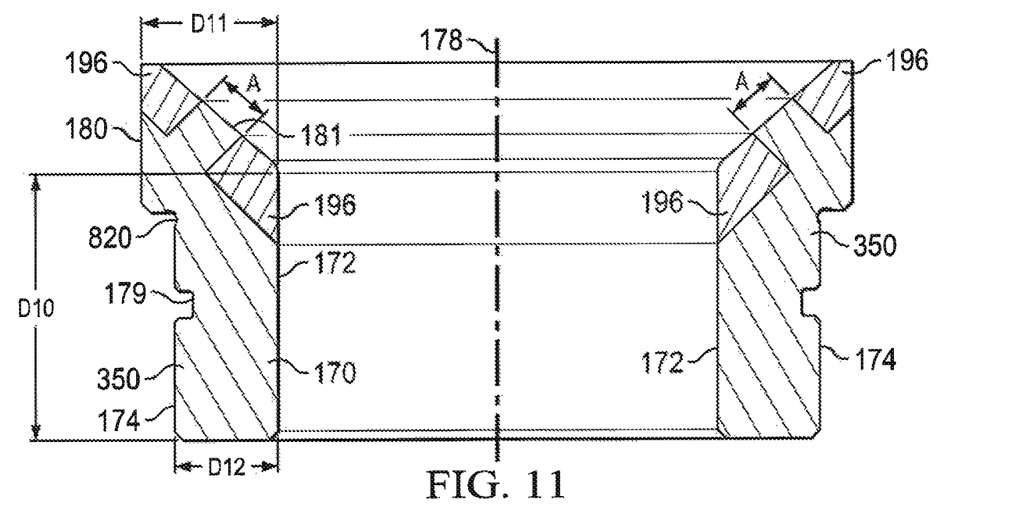
FIG. 11 is a cross-sectional view of a valve seat, according to one example.

FIG. 11 illustrates another example of a seat valve 166 with an insert 196 and a metallic body 350. In this example, the seating surface 181 of the second body 180 is covered at two separate areas with hardened material of the insert 196, and the remaining portion of the seating surface 181 is formed of steel. Additionally or alternatively, the insert 196 covers and otherwise forms only a portion of the inner surface 172 of the cylindrical body 170, and the remaining portion of the inner surface 172 is formed of steel.

Figure 12:
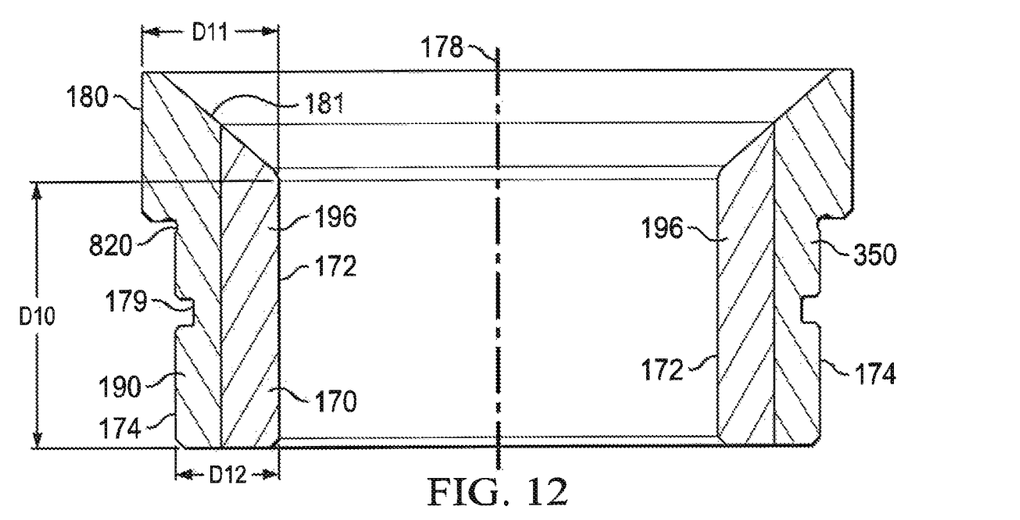
FIG. 12 is a cross-sectional view of a valve seat, according to one example.

FIG. 12 illustrates another example of a valve seat 166 with an insert 196 and a metallic portion 350. In this example, the insert 196 is cylindrically formed and positioned to form the entirety of the inner surface 172 of the cylindrical body 170 and along part (e.g., 33%, 50%, 66%, etc.) of the seating surface 181 of the second body 180. The metallic portion 350 is secured to the wall 314 of the insert 196 and forms the entire outer surface 174 of the first body 170 and a portion of the seating surface 181. As illustrated, the second body 180 in this example has a lower portion (closer to the first body 170) of the seating surface 181 made of the hardened material insert 196 and an upper portion (away from the first body 170) made of the metallic body 350. In one example, the metallic body 350 and the insert 196 meet at half of the distance D11. Other examples have these two meeting at different lengths of D11 (e.g., 20%, 33%, 66%, etc.).

Figure 15:
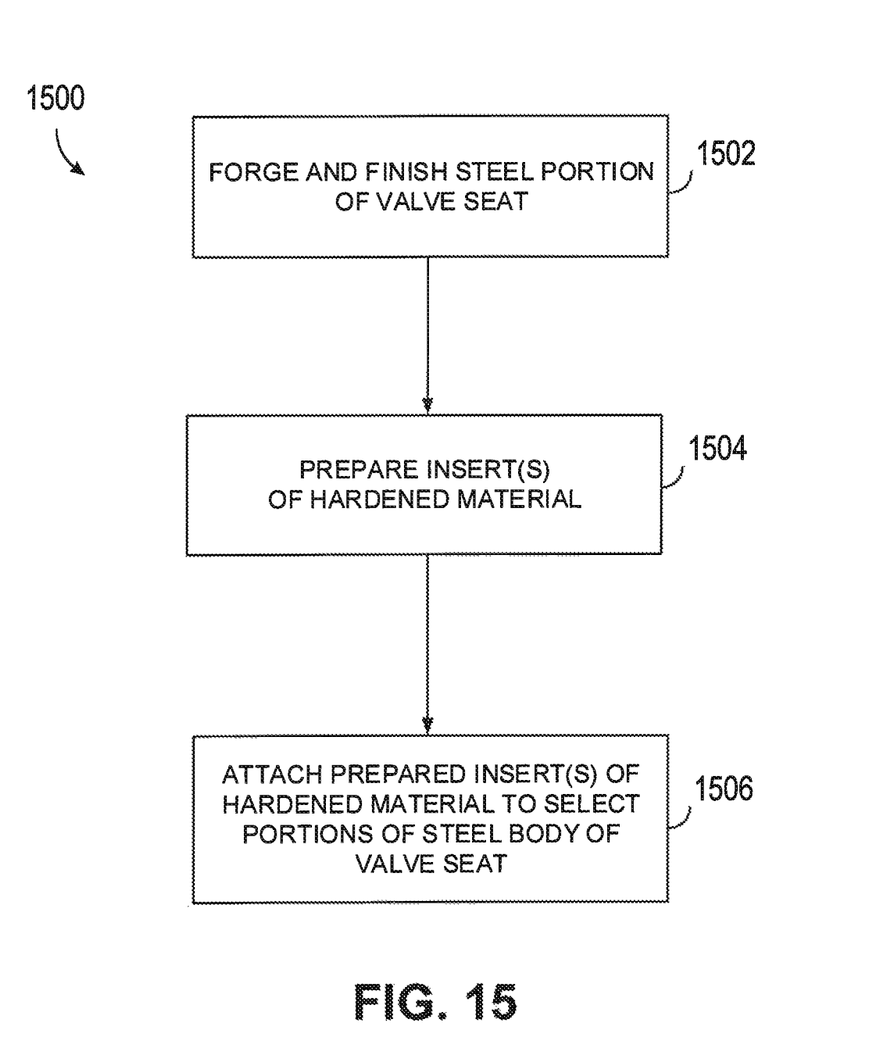
FIG. 15 is a flowchart illustrating a workflow for manufacturing valve seats, according to one example.

FIG. 15 illustrates a work flow 1500 for manufacturing a valve seat 166 that is made partly from steel and partly from a hardened material. As shown at 1502, the metallic body 350 of the valve seat 166 is forged and finished out of steel. The metallic body is prepared for a hardened material insert 196 (or inserts) to be adhered, as shown at 1504. This may include treating, heating, welding, cooling, applying adhesive or glue, bonding, or otherwise preparing places selective portions of the valve seat 166 particularly susceptible to corrosion, erosion, pitting, etc. for placement of the hardened material insert(s) 196. As shown at 1506, the one or more inserts 196 are attached to a portion (or portions) of the prepared steel. Attachment may be performed using any the previously discussed techniques, e.g., cast in place, shrunk via cold temperatures and put in place, friction welded, applied with a brazing solution, glued or bonded via some adhesive, chemically bonded, melted in an oven, held by elastomeric seal, otherwise affixed. In certain examples, the insert 196 is fixed to the valve seat 166 or the valve body 168 by a press-fit, shrink-fit, bonding, sintering, welding or combinations thereof. Other examples reverse that process, e.g., by press-fitting, shrink-fitting, bonding, sintering, or welding the valve body 168 or valve seat 166 to the insert 196.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

The subject matter disclosed herein is described with specificity to meet statutory requirements. The description itself is not intended to limit the scope of this patent. Rather, the inventors have contemplated that the claimed subject matter might also be embodied in other ways, to include different steps or combinations of steps similar to the ones described in this document, in conjunction with other present or future technologies. Although the terms "step" and/or "block" may be used herein to connote different elements of methods employed, the terms should not be interpreted as implying any particular order among or between various steps herein disclosed unless and except when the order of individual steps is explicitly described. The order of execution or performance of the operations in examples of the disclosure illustrated and described herein is not essential, unless otherwise specified. The operations may be performed in any order, unless otherwise specified, and examples of the disclosure may include additional or fewer operations than those disclosed herein. It is therefore contemplated that executing or performing a particular operation before, contemporaneously with, or after another operation is within the scope of aspects of the disclosure.

What is claimed is:

1. A valve seat comprising:
   a frustro-conical portion forming a tapered shoulder for receiving a distal end of a valve;
   a longitudinal portion forming an inner wall and an outer wall, wherein the outer wall is configured to sealingly engage an inside surface of a fluid inlet passage and the inner wall forms a continuous transition from the tapered shoulder for allowing fluid to flow along a direction of the fluid inlet passage;
   a hardened material insert forming a portion of the tapered shoulder and a portion of the inner wall, wherein the portion of the inner wall is configured to receive at least one leg of the valve; and
   a metal portion fixed to the hardened material insert, the metal portion forming the frustro-conical portion and the longitudinal portion other than the portion of the inner wall and the portion of the tapered shoulder of the hardened material insert.

2. The valve seat of claim 1, wherein the portion of the inner wall of the hardened material constrains the at least one leg of the valve from moving in a radial direction.

3. The valve seat of claim 1, wherein the hardened material insert is made of tungsten carbide.

4. The valve seat of claim 1, wherein the hardened material insert is made of zirconia.

5. The valve seat of claim 1, wherein the hardened material insert is partially made of stabilized zirconia.

6. The valve seat of claim 1, wherein the hardened material insert is made of tungsten carbide nickel.

7. The valve seat of claim 1, wherein the hardened material insert is made of tungsten carbide cobalt.

8. The valve seat of claim 1, wherein the hardened material insert is made of silicon nitride.

9. The valve seat of claim 1, wherein the hardened material insert is made of sialon.

10. The valve seat of claim 1, wherein the outer wall forms a cylindrical shape and includes a groove for holding a seal.

11. The valve seat of claim 10, wherein the frustro-conical portion extends radially beyond the cylindrical shape formed of the outer wall of the longitudinal portion such that the frustro-conical portion stops the valve seat from moving in an axial direction when the longitudinal portion is fully inserted into the fluid inlet passage and the valve exerts a closing pressure on the taper shoulder.

12. The valve seat of claim 1, wherein the distal end of the valve is made of a softer material than the hardened material insert.

13. A valve assembly for use in a fracturing pump, the valve assembly comprising:
    a valve member reciprocatably movable into and out of engagement with a valve seat body to configure the valve assembly between open and closed positions, the valve member having a distal end for sealing against the valve seat and one or more legs for restraining lateral movement of the valve with respect to the valve seat;
    wherein the valve seat body includes a first body configured to be inserted into a fluid passageway of the fracturing pump, the first body having an inner cylindrical surface and an outer cylindrical surface, wherein the outer cylindrical surface has an outer diameter, D1;
    a second body extending radially from the first body having an inner surface facing the valve member and an opposed outer surface configured to contact the fluid passageway, the second body having an outer diameter, D2, greater than the outer diameter, D1, such that the difference between the diameters D2 and D1 allows the first body to be longitudinally supported by the fluid passageway;
    a hardened material insert forming a portion of the inner cylindrical surface of the first body and a portion of the inner surface of the second body such that the hardened material insert contacts the distal end and the one or more legs of the valve member; and
    a metal portion fixed to the hardened material insert, the metal portion forming the first body and the second body other than the portion of the inner cylindrical surface of the first body and the portion of the inner surface of the second body of the hardened material insert.

14. The valve assembly of claim 13, wherein the second body is a tapered shoulder.

15. The valve assembly of claim 13, wherein the second body is a tapered shoulder extending radially from the first body at an angle between five and seventy-five degrees.

16. The valve assembly of claim 13, wherein the ceramic insert is formed having a constant thickness along an extension direction of the second body and a longitudinal direction of the first body.

17. The valve assembly of claim 13, wherein the ceramic insert has a top surface that is in the same plane as the inner surface of the second body.

18. The valve assembly of claim 13, wherein the hardened material insert and the metal portion are fixed together by bonding, press-fit, shrink-fit, sintering, or combination thereof.

19. The valve assembly of claim 13, wherein the hardened material insert has a material hardness value, H1, greater than a material hardness value, H2, of the metal portion.

20. A reciprocating pump assembly, comprising:
a power end coupled to a fluid end, the fluid end having a fluid inlet passage co-axially aligned with a fluid outlet passage;
a valve assembly disposed within each of the fluid inlet passage and the fluid outlet passage, each valve assembly comprising:
a valve member reciprocatably movable into and out of engagement with a valve seat body to configure the valve assembly between open and closed positions;
wherein the valve seat body includes a first body configured to be inserted into the fluid inlet passage, the first body having an inner cylindrical surface and an outer cylindrical surface, wherein the outer cylindrical surface has an outer diameter, D1;
a second body extending radially from the first body having an inner surface facing the valve member and an opposed outer surface configured to contact the fluid passageway, the second body having an outer diameter, D2, greater than the outer diameter, D1, such that the difference between the diameters D2 and D1 allows the first body to be longitudinally supported by the fluid passageway;
a hardened material insert forming a portion of the inner cylindrical surface of the first body and a portion of the inner surface of the second body such that the hardened material insert contacts the distal end and the one or more legs of the valve member; and
a metal portion fixed to the hardened material insert, the metal portion forming the first body and the second body other than the portion of the inner cylindrical surface of the first body and the portion of the inner surface of the second body of the hardened material insert.

* * * * *